United States Patent
Mizrahi et al.

(10) Patent No.: US 9,337,933 B2
(45) Date of Patent: May 10, 2016

(54) INTEGRATED OPTICAL NETWORK UNIT

(71) Applicant: Skorpios Technologies, Inc., Albuquerque, NM (US)

(72) Inventors: Amit Mizrahi, Albuquerque, NM (US); Robert J. Stone, Berkeley, CA (US); Stephen B. Krasulick, Albuquerque, NM (US); Timothy Creazzo, Albuquerque, NM (US)

(73) Assignee: Skorpios Technologies, Inc., Albuquerque, NM (US)

( * ) Notice: Subject to any disclaimer, the term of this patent is extended or adjusted under 35 U.S.C. 154(b) by 0 days.

(21) Appl. No.: 14/057,844

(22) Filed: Oct. 18, 2013

(65) Prior Publication Data

US 2014/0112669 A1    Apr. 24, 2014

Related U.S. Application Data

(60) Provisional application No. 61/716,320, filed on Oct. 19, 2012.

(51) Int. Cl.
| | |
|---|---|
| *H04B 10/00* | (2013.01) |
| *H04B 10/04* | (2006.01) |
| *H04B 10/40* | (2013.01) |
| *H04B 10/272* | (2013.01) |
| *H04J 14/02* | (2006.01) |
| *H04J 14/06* | (2006.01) |

(52) U.S. Cl.
CPC .............. *H04B 10/40* (2013.01); *H04B 10/272* (2013.01); *H04J 14/02* (2013.01); *H04J 14/0282* (2013.01); *H04J 14/06* (2013.01)

(58) Field of Classification Search
CPC ... H04B 10/40; H04B 10/272; H04J 14/0282; H04J 14/02

USPC ..................... 398/139, 135, 138, 201; 385/46
See application file for complete search history.

(56) References Cited

U.S. PATENT DOCUMENTS

| | | | | |
|---|---|---|---|---|
| 4,777,459 | A | * 10/1988 | Hudspeth | .............. H01P 1/2138 333/135 |
| 5,077,816 | A | 12/1991 | Glomb et al. | |
| 5,106,764 | A | * 4/1992 | Harriott | ............ H01L 21/30621 148/DIG. 111 |
| 6,097,863 | A | * 8/2000 | Chowdhury | .................... 385/37 |

(Continued)

FOREIGN PATENT DOCUMENTS

| | | |
|---|---|---|
| WO | 2010/137752 A1 | 12/2010 |
| WO | 2013/096688 A1 | 6/2013 |

OTHER PUBLICATIONS

U.S. Non-Final Office Action mailed on Feb. 24, 2014 for U.S. Appl. No. 13/491,395, filed Jun. 7, 2012, all pages.

(Continued)

*Primary Examiner* — Ken Vanderpuye
*Assistant Examiner* — Abbas H Alagheband
(74) *Attorney, Agent, or Firm* — Kilpatrick Townsend & Stockton LLP

(57) ABSTRACT

An optical network unit includes a transmit/receive port and a silicon waveguide optically coupled to the transmit/receive port. The optical network unit also includes a tunable filter coupled to the silicon waveguide and providing a first output for a first frequency band and a second output for a second frequency band. The optical network unit further includes a polarization diverse receiver coupled to the tunable filter and a laser coupled to the tunable filter.

16 Claims, 5 Drawing Sheets

(56) References Cited

U.S. PATENT DOCUMENTS

| | | | |
|---|---|---|---|
| 6,101,026 A | 8/2000 | Baney | |
| 6,546,160 B1 | 4/2003 | Schunk | |
| 7,209,612 B2 * | 4/2007 | Balakrishnan et al. | 385/37 |
| 7,269,317 B2 | 9/2007 | Blauvelt et al. | |
| 7,317,874 B2 * | 1/2008 | Li | H04B 10/506 398/67 |
| 7,526,211 B2 * | 4/2009 | McNicol | H04B 10/50 398/128 |
| 7,701,985 B2 | 4/2010 | Webster et al. | |
| 7,937,000 B2 * | 5/2011 | Yokoyama | 398/213 |
| 7,995,893 B2 | 8/2011 | Bi et al. | |
| 8,150,219 B2 | 4/2012 | Nasu et al. | |
| 8,222,084 B2 * | 7/2012 | Dallesasse | H01L 25/167 257/E21.499 |
| 8,320,760 B1 * | 11/2012 | Lam | H04J 14/002 398/66 |
| 8,615,025 B2 | 12/2013 | Dallesasse et al. | |
| 8,849,072 B2 | 9/2014 | Montoya et al. | |
| 8,897,606 B2 * | 11/2014 | Asghari et al. | 385/2 |
| 2002/0181067 A1 | 12/2002 | Romanovsky et al. | |
| 2003/0198470 A1 | 10/2003 | Lauder et al. | |
| 2004/0114872 A1 | 6/2004 | Nagai | |
| 2004/0218870 A1 | 11/2004 | Blauvelt et al. | |
| 2005/0078913 A1 | 4/2005 | Blauvelt et al. | |
| 2005/0213887 A1 * | 9/2005 | Balakrishnan et al. | 385/46 |
| 2006/0002443 A1 | 1/2006 | Farber et al. | |
| 2006/0018584 A1 | 1/2006 | Watts et al. | |
| 2006/0097816 A1 | 5/2006 | Nagai | |
| 2006/0153566 A1 * | 7/2006 | Sorin et al. | 398/72 |
| 2006/0165373 A1 | 7/2006 | Blauvelt et al. | |
| 2007/0154221 A1 * | 7/2007 | McNicol et al. | 398/135 |
| 2007/0167815 A1 | 7/2007 | Jacobsen et al. | |
| 2007/0237450 A1 | 10/2007 | Blauvelt et al. | |
| 2007/0237456 A1 | 10/2007 | Blauvelt et al. | |
| 2007/0253661 A1 | 11/2007 | Black et al. | |
| 2007/0280695 A1 * | 12/2007 | Li et al. | 398/135 |
| 2008/0019637 A1 | 1/2008 | Little et al. | |
| 2008/0031572 A1 | 2/2008 | Blauvelt et al. | |
| 2008/0240725 A1 * | 10/2008 | Yokoyama | 398/139 |
| 2009/0010648 A1 | 1/2009 | Zuhdi | |
| 2009/0047019 A1 * | 2/2009 | Palacharla | H04B 10/275 398/59 |
| 2009/0110344 A1 | 4/2009 | Little et al. | |
| 2009/0136191 A1 | 5/2009 | Bi et al. | |
| 2010/0002989 A1 | 1/2010 | Tokushima | |
| 2010/0054751 A1 | 3/2010 | Murry et al. | |
| 2010/0104237 A1 | 4/2010 | Nasu et al. | |
| 2010/0129077 A1 * | 5/2010 | Bainbridge et al. | 398/79 |
| 2010/0209038 A1 * | 8/2010 | Popovic et al. | 385/1 |
| 2010/0316327 A1 | 12/2010 | Montoya et al. | |
| 2010/0316373 A1 * | 12/2010 | Chang et al. | 398/12 |
| 2011/0076025 A1 * | 3/2011 | Shimura | H04B 10/40 398/139 |
| 2011/0135251 A1 | 6/2011 | Kato | |
| 2011/0150384 A1 | 6/2011 | Nagarajan et al. | |
| 2011/0262131 A1 * | 10/2011 | Gottwald | H04B 10/2503 398/41 |
| 2011/0293275 A1 | 12/2011 | Evans et al. | |
| 2011/0311229 A1 | 12/2011 | Kondo et al. | |
| 2012/0121216 A1 | 5/2012 | Oh | |
| 2012/0149148 A1 * | 6/2012 | Dallesasse | H01L 25/167 438/107 |
| 2012/0237220 A1 * | 9/2012 | Presi et al. | 398/50 |
| 2012/0264256 A1 * | 10/2012 | Dallesasse | H01L 25/167 438/107 |
| 2012/0275786 A1 * | 11/2012 | Grobe | 398/45 |
| 2012/0296604 A1 * | 11/2012 | Bienstman | C10J 3/463 702/172 |
| 2012/0315040 A1 * | 12/2012 | Dahlfort et al. | 398/58 |
| 2013/0089319 A1 * | 4/2013 | Grobe et al. | 398/7 |
| 2013/0089324 A1 * | 4/2013 | Eiselt | 398/34 |
| 2013/0142474 A1 | 6/2013 | Dallesasse et al. | |
| 2013/0142475 A1 * | 6/2013 | Dallesasse et al. | 385/11 |
| 2013/0142476 A1 * | 6/2013 | Dallesasse et al. | 385/11 |
| 2013/0183044 A1 | 7/2013 | Stone et al. | |
| 2013/0188904 A1 * | 7/2013 | Min | H01S 5/021 385/14 |

OTHER PUBLICATIONS

U.S. Non-Final Office Action mailed on Jun. 20, 2014 for U.S. Appl. No. 13/491,360, filed Jun. 7, 2012, all pages.

U.S. Non-Final Office Action mailed on Jun. 20, 2014 for U.S. Appl. No. 13/491,395, filed Jun. 7, 2012, all pages.

U.S. Office Action mailed on Oct. 8, 2014 for U.S. Appl. No. 13/491,360, filed Jun. 7, 2012, all pages.

U.S. Final Office Action mailed on Oct. 29, 2014 for U.S. Appl. No. 13/491,395, filed Jun. 7, 2012, all pages.

Non-Final Office Action dated on Jan. 2, 2015 for U.S. Appl. No. 13/722,132, filed Dec. 20, 2012, all pages.

Final Office Action dated May 5, 2015 for U.S. Appl. No. 13/722,132, filed Dec. 20, 2012, all pages.

ISR/WO mailed on Mar. 7, 2013 for International Patent Application No. PCT/US2012/071075 filed on Dec. 12, 2012, all pages.

IPRP mailed on Jun. 24, 2014 for International Patent Application No. PCT/US2012/071075 filed on Dec. 12, 2012, all pages.

* cited by examiner

INTEGRATED OPTICAL NETWORK UNIT

CROSS-REFERENCES TO RELATED APPLICATIONS

This application claims priority to U.S. Provisional Patent Application No. 61/716,320, filed on Oct. 19, 2012, entitled "Integrated Optical Network Unit," the disclosure of which is hereby incorporated by reference in its entirety for all purposes.

BACKGROUND OF THE INVENTION

There is currently interest in providing high speed data-communications to users, including fiber to the home for ultra high-speed internet. An optical network unit (ONU) is a device that transmits and receives optical signals into electronic signals at an endpoint, which can be, for example, a customer's home or office. Using an optical fiber network and an ONU, data-communications services can be provided at high performance levels.

Despite the progress made in developing high speed data-communications networks, there is a need in the art for improved methods and systems related to ONUs.

SUMMARY OF THE INVENTION

Embodiments of the present invention relate to photonic devices. More particularly, embodiments of the present invention relate to an Optical Network Unit (ONU) suitable for transmitting and receiving light for data communications. The ONU is implemented in silicon photonics to provide the device functionality in, for example, a single integrated device or chip, thereby achieving small size, low power dissipation, and low cost.

Embodiments of the present invention relate to photonic devices. More particularly, embodiments of the present invention relate to an Optical Network Unit (ONU) suitable for transmitting light for data communications. The ONU is implemented in silicon photonics to provide the device functionality in, for example, a single integrated device or chip.

According to an embodiment of the present invention, an optical network unit is provided. The optical network unit includes a transmit/receive port and a silicon waveguide optically coupled to the transmit/receive port. The optical network unit also includes a tunable filter coupled to the silicon waveguide and providing a first output for a first frequency band and a second output for a second frequency band. The optical network unit further includes a polarization diverse receiver coupled to the tunable filter and a laser coupled to the tunable filter.

According to another embodiment of the present invention, an optical network unit is provided. The optical network unit includes a transmit/receive port, a silicon waveguide optically coupled to the transmit/receive port, and a polarization splitter coupled to the silicon waveguide and providing a first output and a second output. The optical network unit also includes a first filter coupled to the first output of the polarization splitter. The first filter provides a first output port and a second output port. The optical network unit further includes a polarization rotator coupled to the second output of the polarization filter, a second filter coupled to the first output port, a third filter coupled to the polarization rotator, a detector coupled to the second filter and the third filter, and a laser coupled to the second output port.

According to a particular embodiment of the present invention, a method of operating a transceiver is provided. The method includes receiving, at a Tx/Rx port, a downstream optical signal comprising data in multiple wavelength bands including an L-band, passing the received optical signal through a tunable single channel filter, and detecting the passed optical signal at a polarization diverse receiver. The method also includes generating an upstream optical signal in the C-band, transmitting the upstream optical signal through the tunable single channel filter, and outputting the upstream optical signal from the Tx/Rx port.

Numerous benefits are achieved by way of the present invention over conventional techniques. For example, embodiments of the present invention provide methods and systems for transceivers that significantly reduce cost and size in comparison with conventional approaches. These and other embodiments of the invention along with many of its advantages and features are described in more detail in conjunction with the text below and attached figures.

DETAILED DESCRIPTION OF SPECIFIC EMBODIMENTS

Embodiments of the present invention relate to photonic devices. More particularly, embodiments of the present invention relate to an Optical Network Unit (ONU) suitable for transmitting and receiving light for data communications. The ONU is implemented in silicon photonics to provide the device functionality in, for example, a single integrated device or chip.

Figure 1:
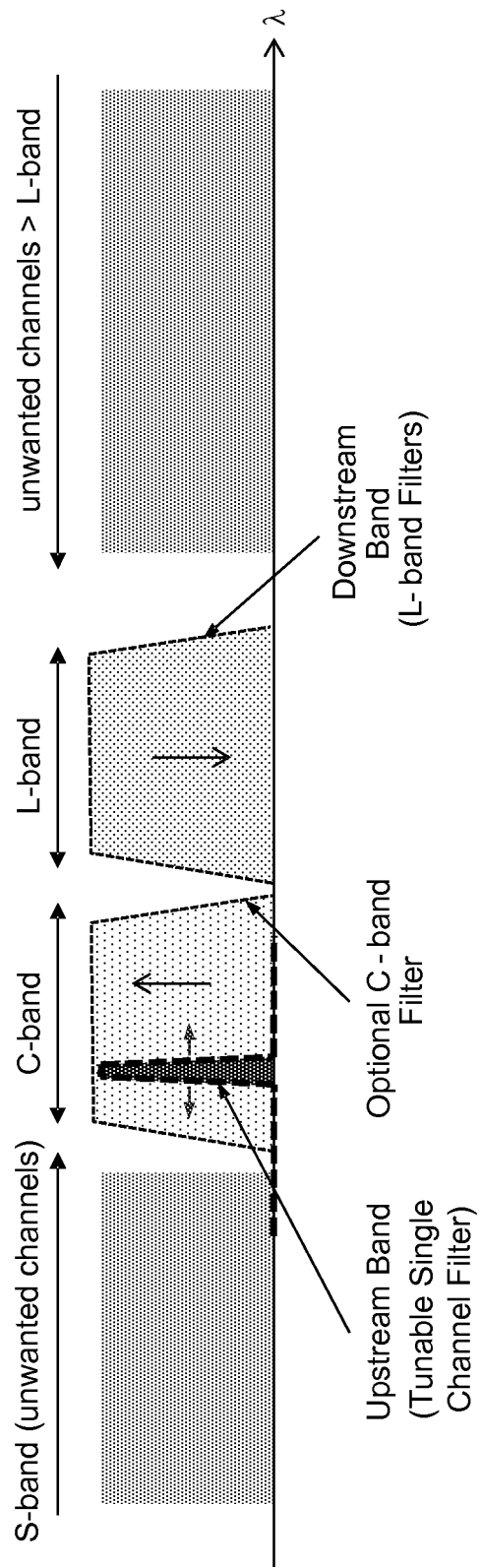
FIG. 1 illustrates a band plan for operation of an ONU as illustrated in FIG. 2.
Figure 2:
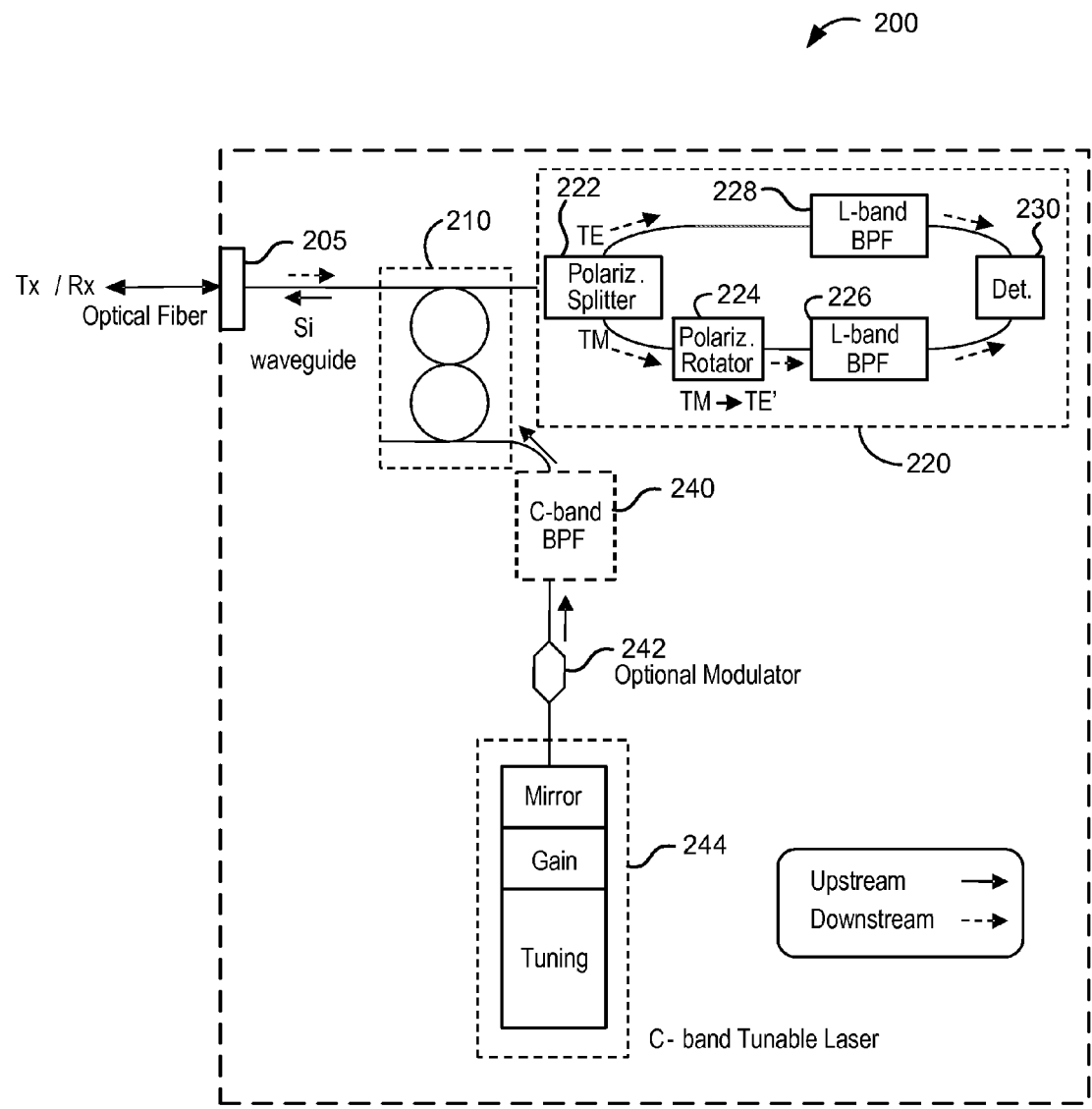
FIG. 2 illustrates an implementation of an ONU according to an embodiment of the present invention

FIG. 1 illustrates a band plan for operation of an ONU as illustrated in FIG. 2. In summary, L-band channels are utilized for downstream communications and C-band channels are utilized for upstream communications. As illustrated in FIG. 1, data transmitted and received in various bands is illustrated. On the lower wavelength portion of the band plan, S-band signals, which are representative of unwanted channels in the telecommunications system are present. On the higher wavelength portion of the band plan, signals with wavelengths greater than L-band signals are also illustrated as additional unwanted channels present in the telecommunications system.

In order to provide for transmission of L-band signals used in downstream communications, L-band band pass filters with a predetermined wavelength range are used to transmit L-band signals and to filter out the unwanted S-band channels, the C-band channels, and the unwanted channels at wavelengths greater than the L-band. Referring to FIG. 2, L-band band pass filter 226 and 228 are illustrated and provide the functionality illustrated by the L-band filters shown in FIG. 1. The unwanted S-band channels and unwanted channels at wavelengths greater than the L-band are representative of different wavelengths that are present in the network but not utilized by this particular ONU. As example, legacy systems that are also connected to the network may be sources of these unwanted signals. One of ordinary skill in the art would recognize many variations, modifications, and alternatives.

In order to provide for transmission of C-band signals used in upstream communications, C-band band pass filters with a second predetermined wavelength range are used to transmit the C-band signals and to filter out the unwanted S-band channels, the L-band channels, and the unwanted channels at wavelengths greater than the L-band. Referring to FIG. 2, optional C-band band pass filter 240 is illustrated and provides the functionality illustrated by the C-band filter shown in FIG. 1. Additionally, the band plan illustrates the wavelength range associated with the tunable single channel filter illustrated by tunable single channel filter 210 that is discussed in relation to FIG. 2. The tunability of the tunable single channel filter is illustrated, as well as the narrower wavelength range covered by this filter in comparison with the C-band filter.

FIG. 2 illustrates an ONU that can be placed in a home of a user in a fiber to the home implementation, although this particular implementation is not required by the present invention. As described below, the ONU 200, which can also be referred to as a transceiver, provides a bidirectional communications capability over a single fiber. A transmit/receive port 205 is provided and an optical fiber is connected to this Tx/Rx port. Downstream data (data being delivered to the premises of the ONU) is transmitted from the network to the ONU and received at Tx/Rx port 205. As described more fully below, embodiments of the present invention provide an architecture in which downstream communications signals at a particular wavelength or frequency are received and delivered to a receiver and upstream communications signals at a different wavelength or frequency are generated using a tunable laser and transmitted upstream to the network. In order to provide this bidirectional functionality, various filters are utilized as described herein to filter particular signals from reaching the receiver (more particularly a detector in the receiver) and the tunable laser, which could adversely impact performance. In particular, the light generated using the tunable laser 244 is filtered such that it does not reach detector 230 (e.g., a PIN detector) in substantial amounts and the downstream light is filtered such that it does not reach the tunable laser 244 in substantial amounts.

The downstream signal is received at Tx/Rx port 205 and passes through tunable single channel filter 210, which is tuned such that it is resonant with one of the C-band channels and is not resonant with the downstream signals in the L-band. In some implementations, light "passes" through the filter, e.g., from the top left port to the top right port, when the light is not resonant with the filter. Light is alternatively "transmitted" through the filter, e.g., from the top left port to the bottom right port, when the light is resonant with the filter. Thus, filtering is performed for light passing to one of two output ports in these configurations. Accordingly, the downstream signals pass through the tunable single channel filter 210 from the upper left port to the upper right port and are received at the polarization diverse receiver (Rx) 220, also referred to as a receiver, which includes components including L-band band pass filters in some embodiments. The polarization diverse receiver 220 accommodates both TE and TM polarizations as inputs and is capable of receiving both of them efficiently and transmitting them to detector 230.

In the receiver 220, the signal is split into TE and TM signals by the polarization splitter 222, the TM polarization is rotated to TE polarization (i.e., TE') by the polarization rotator 224 and propagated through the lower portion of the ring. The TE polarization signal propagates through the upper portion of the ring and is passed through L-band band pass filter 228. The TE' polarization signal is passed through L-band band pass filter 226. It is understood that the waveguides in each path of TE and TE' are designed in length, such that the two optical paths are equal, and the signals reach the detector 230 at the same time. The L-band BPFs 226 and 228 can remove signals that are not in the L-band, for example, C-band signals reflected from the network or other signals in other bands. Thus, filtering of signals outside the desired band is provided. In some embodiments, the L-band band pass filters 226 and 228 are optional.

It should be noted that although L-band signals are used for the downstream communications in this example, this is not required by the present invention and other signals in other bands can be utilized according to various embodiments of the present invention.

In the illustrated embodiment, tunable laser 244 operating in the C-band is used to provide data that is pushed upstream onto the optical fiber through Tx/Rx port 205. The upstream C-band data is illustrated by the solid arrows and the detector 230 (e.g., a PIN photodiode) is used to receive L-band data coming downstream from the optical fiber as discussed above. Although upstream data is illustrated in the C-band and the downstream data is illustrated in the L-band, these particular frequency bands are not required by embodiments of the present invention and other bands can be utilized as discussed above. One of ordinary skill in the art would recognize many variations, modifications, and alternatives.

Referring to the upstream data path, light generated using tunable laser 244 is optionally modulated using optional external modulator 242 and optionally filtered using optional C-band band pass filter 240. Because the tunable single channel filter 210 is resonant for a C-band channel, it couples the desired C-band channel from the lower right port to the upper left port and to the silicon waveguide disposed between the Tx/Rx port 205 and the tunable single channel filter 210 and passes to the optical fiber. The silicon waveguide disposed between the Tx/Rx port 205 and the tunable single channel filter 210 can be referred to as a "bus waveguide" since it carries both upstream and downstream data. Although FIG. 2 illustrates the use of a ring-resonant filter to implement tunable single channel filter 210, this particular filter design is not required by the present invention and other suitable filters can be used, for example, directional couplers, sidewall modulated waveguides, array waveguide gratings, or the like.

In FIG. 2, tunable single channel filter is illustrated as a twin ring tunable single channel filter, but other implementations can be used to provide the filter, including multiple rings, non-resonant directional couplers, array waveguide gratings, or the like as discussed above. Referring back to FIG. 1, the tunable single channel filter has a narrow transmission profile associated with light passing from the top left port to the bottom right port and vice versa. Thus, substantially no light having a wavelength outside the desired C-band channel passes from the top left port of the filter to the bottom right port, but is blocked by the filter. Accordingly, light outside the C-band is blocked from reaching the laser and adversely impacting the laser's performance. For light passing through the filter from the top left port to the top right port, no filtering action is provided, thereby passing the downstream data to the polarization diverse receiver 220 and the polarization splitter 222. In some embodiments, tunable single channel filter 210 is an add-drop filter. One of ordinary skill in the art would recognize many variations, modifications, and alternatives.

Referring again to FIG. 2, in some embodiments, higher order resonances in the tunable single channel filter 210 can result in light outside the desired C-band channel being transmitted through the filter from the top left port to the bottom right port and vice versa. Accordingly, to block this light from reaching the tunable laser 244, an optional C-band band pass filter 240 is provided in some embodiments.

Figure 3:
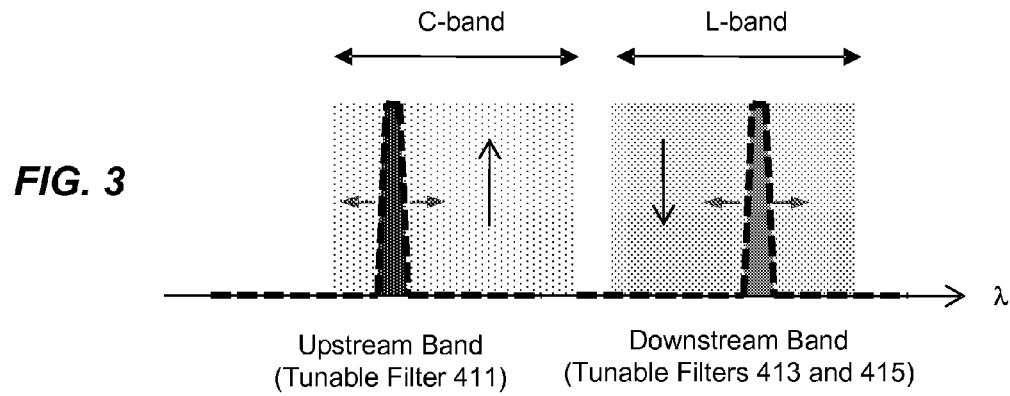
FIG. 3 illustrates a band plan for operation of an ONU as illustrated in FIG. 4.
Figure 4:
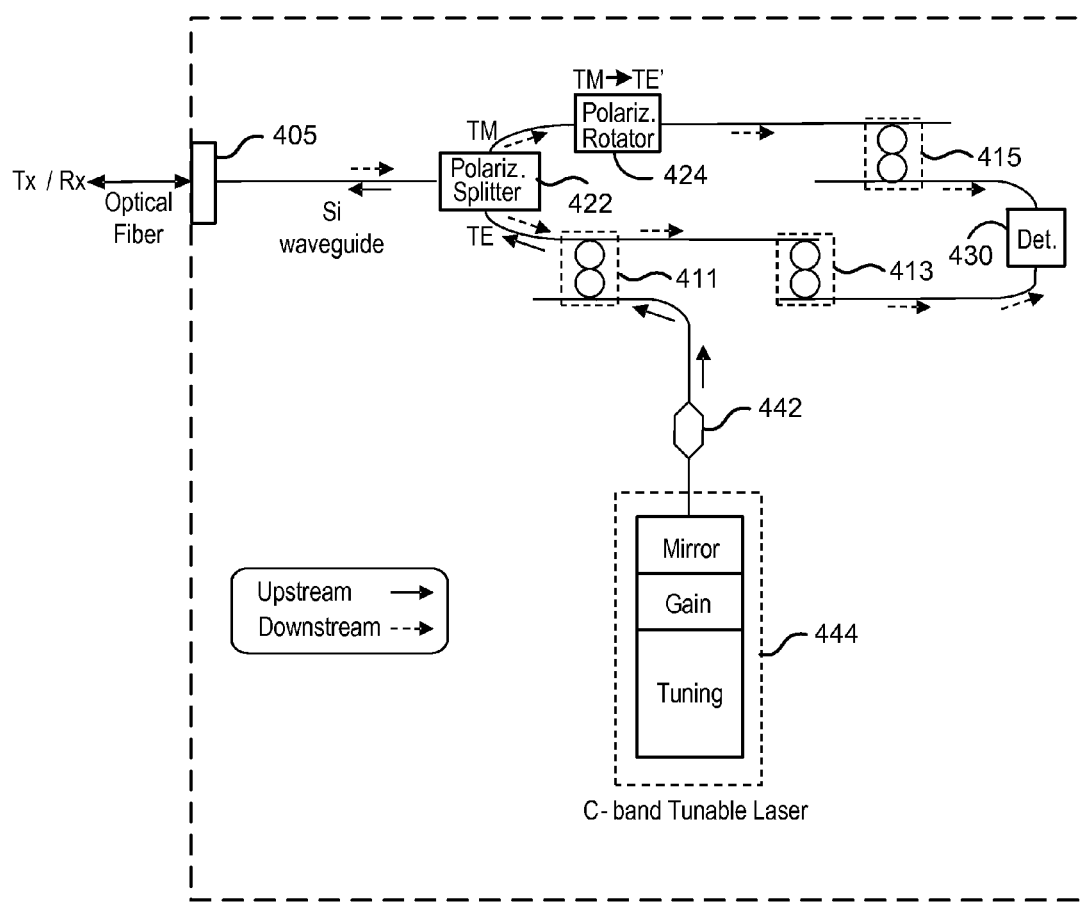
FIG. 4 illustrates another implementation of an ONU according to a particular embodiment of the present invention.

FIG. 3 illustrates a band plan for operation of an ONU as illustrated in FIG. 4. In the band plan illustrated in FIG. 3, tunable filters are utilized in both the upstream band and the downstream band. The filter characteristics of tunable filter 411 discussed in relation to FIG. 4 is illustrated in the upstream C-band and the filter characteristics of tunable filters 413 and 415 discussed in relation to FIG. 4 are illustrated in the downstream L-band.

It should be noted that in some implementations, out-of-band channels (e.g., S-band channels can be filtered using the tunable filters discussed in relation to FIG. 4. Therefore, the band plan shown in FIG. 1 may also be partly or wholly applicable to the operation of the ONU illustrated in FIG. 4. One of ordinary skill in the art would recognize many variations, modifications, and alternatives.

FIG. 4 illustrates another implementation of an ONU according to a particular embodiment of the present invention. The ONU illustrated in FIG. 4 shares some common components with the ONU illustrated in FIG. 2, for example, the Tx/Rx port 405 and silicon waveguide between the Tx/Rx port and the polarization splitter 422. Thus, some of the description provided in reference to FIG. 2 is applicable to FIG. 4 as appropriate. In the implementation illustrated in FIG. 4, some of the wide band pass filters are not utilized, improving the system performance and/or manufacturability.

Referring to FIG. 4, the downstream signal is received and is split into two polarizations by polarization splitter 422. One of the polarizations (e.g., TM) is rotated using polarization rotator 424 (the upper portion of the ring). Light in this waveguide region is filtered using add/drop filter 415 and is incident on detector 430. TE light from the polarization splitter 422 is filtered using add/drop filter 413 and is likewise incident on detector 430. In the embodiment utilizing the band plan in FIG. 3, downstream signals in the L-band are filtered using filters 413 and 415, which are tunable in some embodiments to pass receive path signals, providing for finer filtering than available using wideband filters. Thus, only the downstream signals (e.g., the desired L-band channel) are passed by filters 413 and 415 to the detector (e.g., a PIN photodiode) as the unwanted signals outside the desired band (e.g., C-band signals) are rejected. The L-band channels can be scanned at system startup using the narrow band tunable filters 413 and 415, which can then be fixed for reception of the particular L-band channel being utilized. Although a twin ring tunable single channel filter is illustrated as utilized for filters 413 and 415, other implementations can be used to provide suitable filters for filters 413 and 415. One of skill in the art will appreciate that tunable filters 411, 413, and 415 share common functionality with tunable single channel filter 210 discussed in relation to FIG. 2.

In the upstream channel illustrated in FIG. 4, the C-band signals are generated using a tunable laser 444 operating, for example, in the C-band and optionally modulated using optional external modulator 442. In other embodiments, direct current modulation is utilized. Light in the upstream channel then passes through add/drop filter 411 (from the bottom right port to the top left port as a result of the filter being tuned to resonance with the signal) and the polarization splitter to the silicon waveguide. The tunable laser can emit TE polarized light, which is suitable for transmission through the polarization splitter.

The tunability provided in the receive section of the embodiment illustrated in FIG. 4 (i.e., the tunability of add/drop filters 413 and 415 in comparison with the fixed wavelength operation of band pass filters 226 and 228 in FIG. 2), enables selection of a single, controllable channel in the receive path, thereby increasing system functionality in comparison with other systems. One of ordinary skill in the art would recognize many variations, modifications, and alternatives.

It should be noted that in some applications, the frequency bands can be modified, for example, the downstream data could be in the C-band and the upstream data could be in the L-band. Accordingly, this embodiment would utilize an L-band tunable laser and detect the downstream signal in the C-band. Yet another embodiment could provide an implementation in which all signals are in the C-band, with a first channel in the C-band being used for the upstream data and another channel in the C-band being used for downstream. In this configuration, information could be provided from the network in relation to the channel data for proper device configuration. One of ordinary skill in the art would recognize many variations, modifications, and alternatives.

It should be appreciated that modulation of the laser can be done in multiple ways including externally (e.g., using a Mach-Zehnder modulator as illustrated in the figures), or by direct modulation of the pump current, or by modulation the tunable drop/add filter 411 itself. One of ordinary skill in the art would recognize many variations, modifications, and alternatives.

Additional description related to polarization control elements, including polarization splitters, polarization rotators, and the like, is provided in commonly assigned U.S. Patent Application Publications Nos. 2013-0142474, 2013-0142475, and 2013-0142476, the disclosures of which are hereby incorporated by reference in their entirety.

Figure 5A:
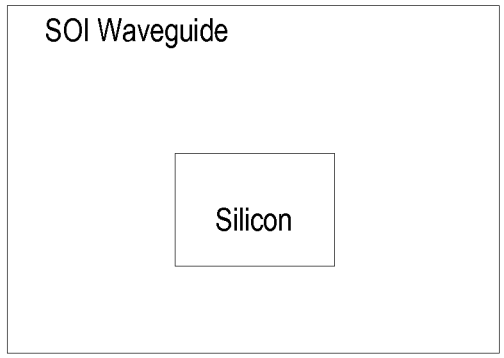
FIG. 5A is a simplified cross-sectional diagram of an SOI waveguide section according to an embodiment of the present invention.

The various components of the system can be implemented in silicon photonics, providing performance improvements in comparison with conventional techniques. FIG. 5A is a simplified cross-sectional diagram of a silicon on insulator (SOI) waveguide section according to an embodiment of the present invention. As illustrated in FIG. 5A, the silicon material (fabricated from the single crystal silicon layer of the SOI structure, is surrounded both laterally and transversely by oxide material, forming a silicon waveguide suitable for supporting light propagation. In some embodiments, the thickness of the silicon layer is thin (e.g., 200 nm-250 nm), while still supporting optical modes.

Figure 5B:
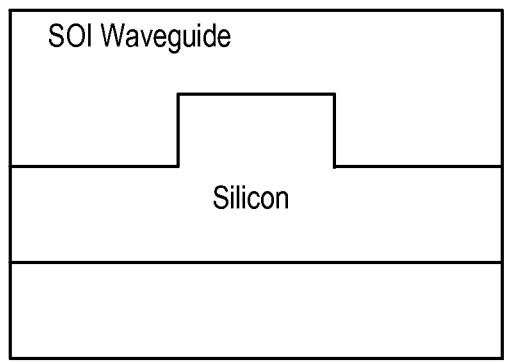
FIG. 5B is a simplified cross-sectional diagram of an SOI waveguide section according to an embodiment of the present invention.

FIG. 5B is a simplified cross-sectional diagram of an SOI waveguide section according to an embodiment of the present invention. This cross section is typical of a thicker single crystal silicon layer, even though this can also be implemented in thin silicon layer. The ONU waveguides can be made of the cross-section of FIG. 5A or the cross-section of FIG. 5B, or a combination of the two. Integration using silicon photonics results in size reductions and cost reductions not available using conventional techniques. Thus, embodiments of the present invention enable delivery of fiber to the home implementations that are not available using conventional systems.

Figure 6:
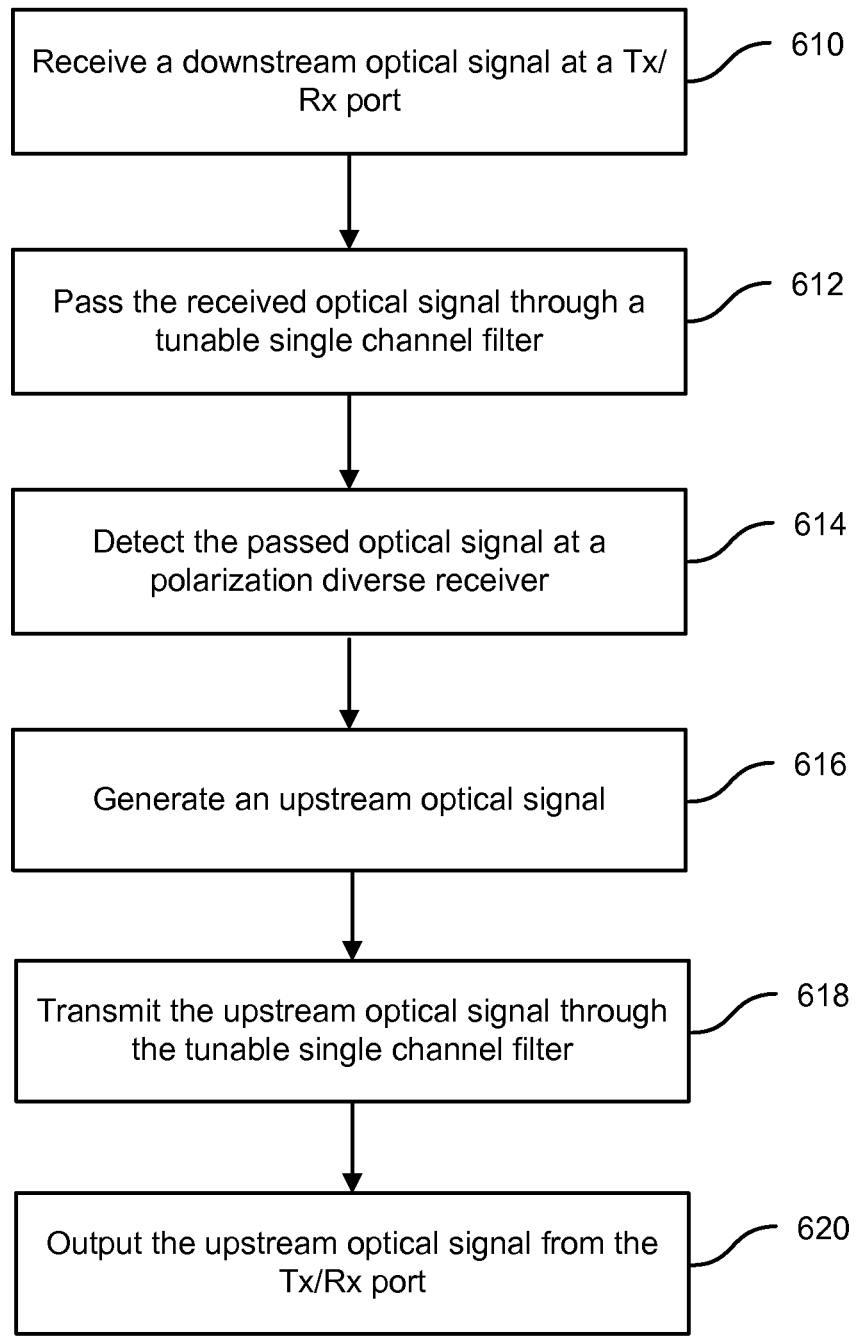
FIG. 6 is a simplified flowchart illustrating a method operating an ONU according to an embodiment of the present invention.

FIG. 6 is a simplified flowchart illustrating a method operating a transceiver (e.g., an ONU) according to an embodiment of the present invention. The method includes receiving, at a Tx/Rx port, a downstream optical signal comprising data in multiple wavelength bands including an L-band (610). The method also includes passing the received optical signal through a tunable single channel filter (612) and detecting the passed optical signal at a polarization diverse receiver (614). The method further includes generating an upstream optical signal in the C-band (616), transmitting the upstream optical signal through the tunable single channel filter (618) and outputting the upstream optical signal from the Tx/Rx port (620).

In an embodiment, the method additionally includes filtering the received optical signal after passing through the tunable single channel filter and before detecting the passed optical signal. This filtering can be performed using wide band filters operable to pass the bands used for downstream data communications. In another embodiment, the polarization diverse receiver includes a polarization splitter having a TE output and a TM output, a polarization rotator operable to receive the TM output and generate a TE' output, a first band pass filter coupled to the TE output, a second band pass filter coupled to the polarization rotator, and a detector coupled to the first band pass filter and the second band pass filter. The band pass filters can be operable to pass L-band signals. In some implementations, the polarizations are switched, with TE replacing TM and TM replacing TE. One of ordinary skill in the art would recognize many variations, modifications, and alternatives.

As described in relation to FIG. 2, generating the upstream optical signal can include producing a laser signal using a tunable laser and modulating the laser signal to generate the upstream optical signal. Additionally, a C-band band pass filter can be used to filter the upstream optical signal as appropriate.

It should be appreciated that the specific steps illustrated in FIG. 6 provide a particular method of operating an ONU according to an embodiment of the present invention. Other sequences of steps may also be performed according to alternative embodiments. For example, alternative embodiments of the present invention may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

The method of operating the ONU illustrated in FIG. 4 share some common features with the method illustrated in FIG. 6. The use of the tunable single channel filters in both the receive path (i.e., transmitting L-band light through filters 413 and 415 in the downstream path) and the transmit path (i.e., transmitting C-band light through filter 411 in the upstream path) modifies the method as would be evident to one of skill in the art.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. An optical network unit comprising:
   a transmit/receive port, wherein the transmit/receive port is configured to be coupled to an optical fiber;
   a silicon waveguide optically coupled to the transmit/receive port, wherein the silicon waveguide is not the same as the optical fiber;
   a tunable filter coupled to the silicon waveguide and providing a first output for a first frequency band and a second output for a second frequency band;
   a polarization diverse receiver coupled to the tunable filter wherein the polarization diverse receiver includes:
      a polarization splitter coupled to the first output and providing a first polarization output and a second polarization output;
      a first L-band band pass filter coupled to the first polarization output;
      a polarization rotator coupled to the second polarization output;
      a second L-band band pass filter coupled to the polarization rotator; and
      a detector coupled to the first L-band band pass filter and the second L-band band pass filter; and
   a laser coupled to the tunable filter.

2. The optical network unit of claim 1 wherein the detector comprises a III-V material coupled to a silicon structure.

3. The optical network unit of claim 1 wherein the detector comprises a germanium material coupled to a silicon structure.

4. The optical network unit of claim 1 wherein the laser comprises a tunable laser.

5. The optical network unit of claim 1 further comprising an optical modulator disposed between the laser and the tunable filter.

6. The optical network unit of claim 1 wherein the tunable filter passes C-band signals from the silicon waveguide to the first output in a downstream path and passes L-band signals from the second output to the silicon waveguide in an upstream path.

7. The optical network unit of claim 1 further comprising a C-band band pass filter coupled to the second output of the tunable filter.

8. The optical network unit of claim 1 wherein the laser comprises a III-V material coupled to a silicon reflector structure.

9. An optical network unit comprising:
   a transmit/receive port;
   a silicon waveguide optically coupled to the transmit/receive port;
   a polarization splitter coupled to the silicon waveguide and providing a first output and a second output;
   a first filter coupled to the first output of the polarization splitter, wherein the first filter provides a first output port and a second output port;
   a polarization rotator coupled to the second output of the polarization splitter;
   a second filter coupled to the first output port;
   a third filter coupled to the polarization rotator;
   a detector coupled to the second filter and the third filter; and
   a laser coupled to the second output port.

10. The optical network unit of claim 9 wherein the laser comprises a III-V material coupled to a silicon reflector structure.

11. The optical network unit of claim 9 wherein the detector comprises a III-V material coupled to a silicon structure.

12. A method of operating a transceiver, the method comprising:
    receiving, at a Tx/Rx port, a downstream optical signal comprising data in multiple wavelength bands including an L-band, wherein the downstream optical signal is received from an optical fiber coupled to the Tx/Rx port;
passing the received optical signal from the Tx/Rx port through a silicon waveguide and through a tunable single channel filter;
detecting the passed optical signal at a polarization diverse receiver, wherein the polarization diverse receiver includes:
 a polarization splitter having a TE output and a TM output;
 a polarization rotator operable to receive the TM output and generate a TE' output;
 a first band pass filter coupled to the TE output;
 a second band pass filter coupled to the polarization rotator; and
 a detector coupled to the first band pass filter and the second band pass filter;
generating an upstream optical signal in a C-band;
transmitting the upstream optical signal through the tunable single channel filter; and
outputting the upstream optical signal from the Tx/Rx port.

13. The method of claim 12 further comprising filtering the received optical signal after passing through the tunable single channel filter and before detecting the passed optical signal.

14. The method of claim 12 wherein the first band pass filter and the second band pass filter are operable to pass L-band signals.

15. The method of claim 12 wherein generating the upstream optical signal comprises:
 producing a laser signal using a tunable laser; and
 modulating the laser signal to generate the upstream optical signal.

16. The method of claim 15 further comprising filtering the upstream optical signal using a C-band band pass filter.

* * * * *